United States Patent [19]
Allgaier et al.

[11] 3,820,814
[45] June 28, 1974

[54] DISCHARGE VALVE FOR AN AIR BAG

[75] Inventors: Rudolf Allgaier, Nagold; Luigi Brambilla, Sindelfingen; Hansjurgen Scholz, Echterdingen, all of Germany

[73] Assignee: Daimler-Benz Aktiengesellschaft, Stuttgart-Unterturkheim, Germany

[22] Filed: Apr. 3, 1972

[21] Appl. No.: 240,372

[30] Foreign Application Priority Data
Apr. 3, 1971 Germany............................ 2116347

[52] U.S. Cl. ......... 280/150 AB, 5/348, 137/516.27, 182/137
[51] Int. Cl............................................. B60r 21/08
[58] Field of Search .......... 280/150 AB; 244/138 R; 5/348; 182/137; 137/516.25, 517

[56] References Cited
UNITED STATES PATENTS

| | | | |
|---|---|---|---|
| 2,926,686 | 3/1960 | Gheen............................ | 137/517 |
| 2,958,487 | 11/1960 | Fraebel........................... | 244/138 R |
| 2,964,139 | 12/1960 | Wittl et al........................ | 188/298 |
| 3,247,530 | 4/1966 | Strout et al..................... | 5/348 R |
| 3,288,578 | 11/1966 | Witt.............................. | 137/516.25 |
| 3,451,693 | 6/1969 | Carey........................... | 280/150 AB |
| 3,508,724 | 4/1970 | Scher et al..................... | 244/138 R |
| 3,527,475 | 9/1970 | Carey et al.................... | 280/150 AB |
| 3,573,885 | 4/1971 | Brawn et al.................... | 280/150 AB |
| 3,624,810 | 11/1971 | Hass............................. | 280/150 AB |
| 3,650,223 | 3/1972 | Kobori.......................... | 280/150 AB |

*Primary Examiner*—David Schonberg
*Assistant Examiner*—John P. Silverstrim
*Attorney, Agent, or Firm*—Craig and Antonelli

[57] ABSTRACT

A discharge valve for an air bag serving as passenger protective device in vehicles, especially in motor vehicles, which is automatically inflated by means of a gas when exceeding a predetermined vehicle deceleration and which is also adapted to be emptied with a certain delay by way of the discharge valve; the latter is provided in the walls of the air bag and includes a cup-shaped housing with a discharge aperture arranged within its bottom area; a cover is associated with the discharge aperture which is retained by elastic elements, such as, elastic bands at a spacing upstream of the discharge aperture in relation to the direction of the discharge flow; the cover is adapted to be displaced in the direction toward the discharge aperture as a function of the gas pressure within the air bag against the return force of the elastic elements so as to control the effective area of the discharge aperture as a function of the gas pressure prevailing on the inside of the air bag.

45 Claims, 10 Drawing Figures

PATENTED JUN 28 1974 3,820,814
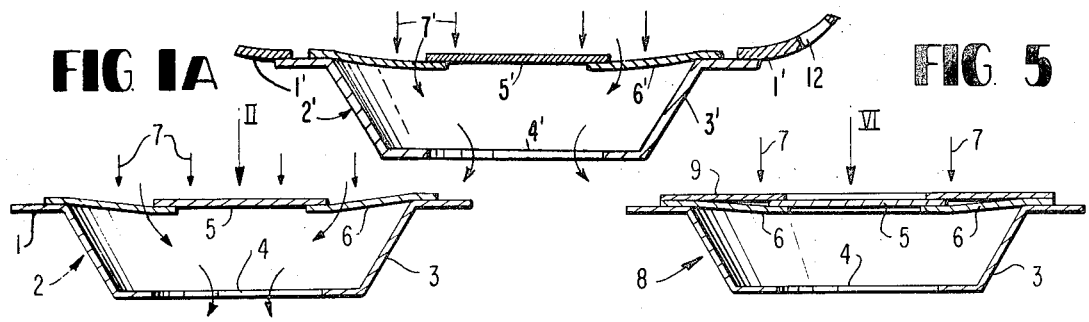
FIG. 1A  FIG. 5
FIG. 1
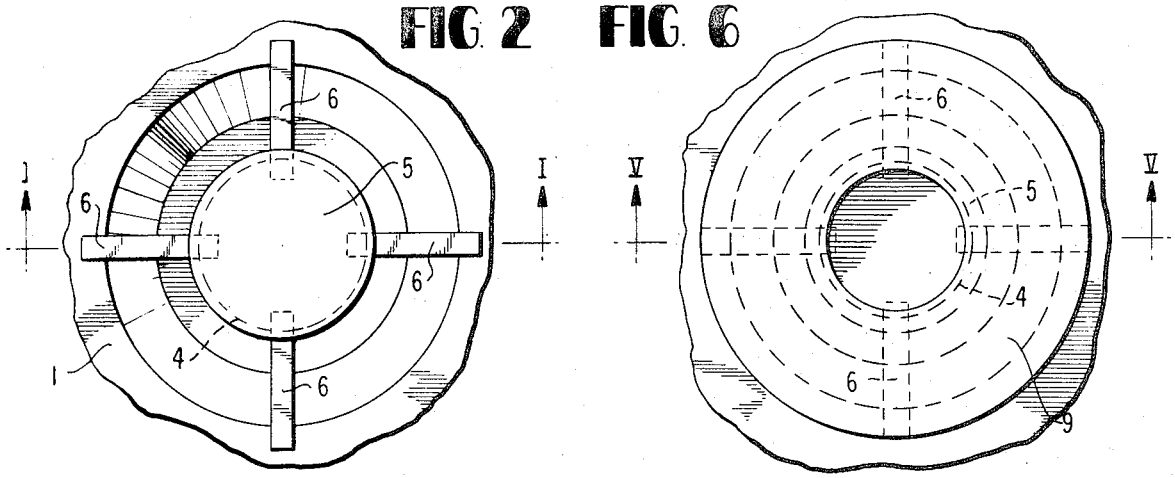
FIG. 2  FIG. 6
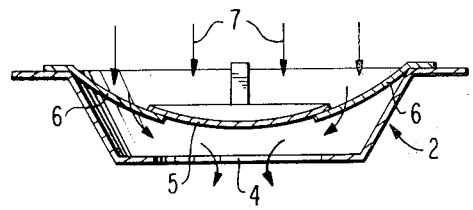
FIG. 3
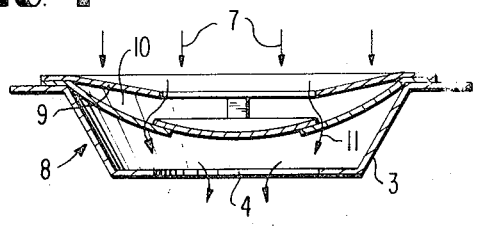
FIG. 7
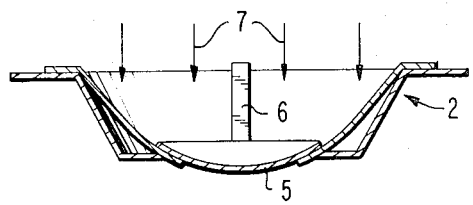
FIG. 4
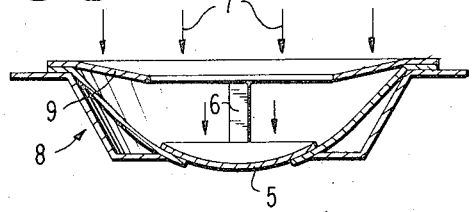
FIG. 8
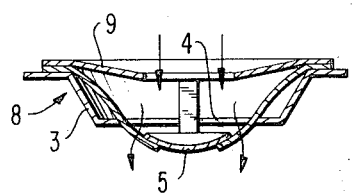
FIG. 9

3,820,814

DISCHARGE VALVE FOR AN AIR BAG

The present invention relates to a discharge valve for an air bag serving as passenger protective device in vehicles, especially in motor vehicles, which is adapted to be automatically inflated by means of a gas upon exceeding a predetermined vehicle deceleration and which is adapted to be emptied with delay by way of the discharge valve.

Air bags provided for the passenger protection have the function to catch the passengers in case of high decelerations of the vehicle as occur, for example, during accidents and to reduce the relative velocity of the passenger with respect to the vehicle which are produced during such decelerations of the vehicle in such a manner that as much as possible there results for the passenger no impact against a part of the body, for example, against the windshield or the instrument panel but only a deceleration which lies within the physical limits still acceptable without larger injuries. The reduction or decrease of the relative velocity between passengers and vehicle, i.e., the deceleration of the passenger with respect to the vehicle, is attained essentially in that gas is permitted to flow out of the air bag which catches the passenger already at smallest possible relative velocity with respect to the vehicle, in a corresponding quantity per time unit.

The present invention is now concerned with the task to so construct a discharge valve of the aforementioned type that with a simple construction of the valve, the discharge or outflow quantity is controlled in dependence on the pressure respectively prevailing in the air bag, which is conditioned by the inflating pressure, on the one hand, as well as by the weight of the passenger and by the magnitude of the relative velocity between passenger and vehicle, on the other, in such a manner that a deceleration results matched to the weight of the passenger and the relative velocity of the latter with respect to the vehicle which enables an optimum possible utilization of the deceleration path available in the vehicle.

This is achieved according to the present invention that the discharge valve provided in the walls of the air bag includes a cupshaped housing protruding in the outflow direction of the gas and provided with a discharge aperture within the bottom area, to which is coordinated a covering which with a spacing relative to the circumferential area of the housing is positioned at a spacing in front of or upstream of the discharge aperture in relation to the discharge or outflow direction, is retained by way of elastic holding elements and is adapted to be displaced in the direction toward the discharge aperture in dependence on the gas pressure in the air bag against the retaining force of the elastic holding elements.

With a discharge valve according to the present invention which is constructed in such a manner, the free discharge cross section of the valve decreases with an increasing pressure in the air bag, and therewith with the increase of the energy to be reduced by means of the air bag so that the damping function of the air bag is controlled both in dependence on the relative velocity between passenger and vehicle resulting during the impact of the vehicle as also on the weight of the passenger, and the retaining force of the air bag with respect to the passenger increases with an increasing kinematic energy inherent therein.

If the discharge valve according to the present invention is so constructed that the covering completely closes the discharge aperture, then the air bag may be provided, in addition to being provided with the discharge valve, with still a further gas discharge opening which assures the outflow or discharge of a minimum gas quantity out of the air bag.

In one embodiment of the discharge valve according to the present invention, the housing thereof may be constructed with advantage of truncated conical shape and may taper in the discharge direction whereby with a relatively small displacement path of the cover means, the discharge cross section can be regulated over a wide range.

A construction of the discharge valve which is particularly simple in conjunction with the air bag, results according to the present invention if the housing of the discharge valve is formed by a bulge of the walls of the air bag and if the cover means, extending in the wall plane of the air bag, is disposed approximately in the edge plane of the cupshaped housing.

It is furthermore appropriate for the constructive assembly of the discharge valve if the cover means is inherently flexible and is formed, for example, by a fabric part.

Elastic bands may be provided within the scope of the present invention as retainng elements which are arranged with advantage uniformly distributed over the circumference of the cover. Appropriately, at least three, however, preferably four elastic bands are provided thereby.

In their starting position, the elastic holding elements are disposed appropriately in a common plane with the cover, and a particularly advantageous solution results if the holding elements together with the cover extend in the normal, initial position within the plane of the wall of the air bag because the holding elements can then be connected directly with the walls of the air bag. This entails a particularly favorable absorption of the forces.

In a constructively advantageous embodiment of the discharge valve according to the present invention, the cover and the discharge aperture may be constructed of circular shape.

If it is to be prevented with an air bag provided with a discharge valve according to the present invention that the air bag commences to empty out immediately after the inflation by way of the discharge valve, then according to the present invention, the annular area disposed between the cover and the housing and bridged by the holding elements can be covered in the normal starting position of the holding elements by a closure ring which is essentially immovable in its position and which is disposed in front or upstream of the holding elements in relation to the discharge direction. With such a construction of the discharge valve, the emptying of the air bag by way of the discharge valve with a corresponding matching of the retaining forces of the holding elements to the inflating pressure of the air bag commences only when loads are applied thereto by the passenger to be caught by means of the air bag.

The closure ring covering the annular area between cover and housing may appropriately be connected directly with the walls of the air bag and consists preferably of an essentially unelastic material of any known type.

Accordingly, it is an object of the present invention to provide a discharge valve for an air bag of a passenger protective installation of a motor vehicle, which avoids by simple means the aforementioned shortcomings and drawbacks encountered in the prior art.

Another object of the present invention resides in a discharge valve for an air bag of a motor vehicle protective installation which is simple in construction yet properly controls the quantity of discharged gases as a function of the relative velocity between passenger and vehicle as well as other relevant factors.

A further object of the present invention resides in a discharge valve of the type described above which is simple in construction, effective in operation for its intended purposes and easily incorporated into an air bag.

Still another object of the present invention resides in a discharge valve for an air bag of a motor vehicle which effectively controls the amount of gases discharged out of the air bag during an impact yet completely eliminates the danger of any injury to the passenger as a result of the presence of the discharge valve.

These and further objects, features, and advantages of the present invention will become more apparent from the following description when taken in connection with the accompanying drawing which shows, for purposes of illustration only, two embodiments in accordance with the present invention, and wherein:

FIG. 1 is a cross-sectional view taken along line I—I of FIG. 2 through a discharge valve according to the present invention which is inserted into the walls of an air bag;

FIG. 1A is a view similar to FIG. 1 which shows a modified embodiment of the present invention;

FIG. 2 is a partial elevational view of the valve of FIG. 1, taken in the direction of arrow II;

FIGS. 3 and 4 are partial cross-sectional views, similar to FIG. 1, of the discharge valve according to the present invention in opening positions different from that of FIG. 1;

FIG. 5 is a cross-sectional view taken along line V—V of FIG. 6 through a further embodiment of a discharge valve according to the present invention;

FIG. 6 is a partial elevational view of the discharge valve according to FIG. 5, taken in the direction of arrow VI; and FIGS. 7–9 are cross-sectional views similar to FIG. 5 through the discharge valve according to FIG. 6 in opening positions differing from that of FIG. 5.

Referring now to the drawing wherein like reference numerals are used throughout the various views to designate like parts, the various figures illustrate a portion of an air bag, not illustrated further herein for the sake of simplicity, which is provided as passenger protective installation in a vehicle, especially in a motor vehicle, and which upon exceeding a predetermined vehicle deceleration is automatically inflatable by means of a gas. A discharge valve is provided in the walls 1 of the air bag, not further illustrated, which in the embodiment according to FIGS. 1 to 4 is generally designated by reference numeral 2. The discharge valve 2 includes a housing 3 which is constructed cup-shaped and is disposed essentially on the outside of the air bag. A discharge aperture 4 is provided in the bottom of the cup-shaped housing 3 having in the illustrated embodiment the form of a truncated cone. A cover 5 is positioned in front of or upstream of the discharge aperture 4 in relation to the discharge direction of the gas out of the air bag as viewed in FIG. 1; the cover 5 is retained in this embodiment, as illustrated in FIG. 2, by way of four holding elements 6 in the form of elastic bands of any known material suitable therefor which are connected with the wall 1 of the air bag. The elastic bands serving as retaining elements 6 extend as shown in FIG. 1, in their normal starting position within the plane of the walls 1 of the air bag and retain the cover 5 correspondingly also in this position insofar as the internal pressure within the air bag is equal to or smaller than the inflating pressure provided for the air bag.

FIG. 1A shows a further embodiment of the present invention which differs from FIG. 1 in that the fabric housing 3' of FIG. 1A is separate from and attached to walls 1' of the bag and in that a further discharge opening 12 is provided for providing a minimum gas discharge. FIG. 1A includes primed reference numerals to depict corresponding similar features as in the FIG. 1 embodiment.

If the air bag which is automatically inflated when exceeding a predetermined vehicle deceleration and which is to catch a passenger of the vehicle, for example, in case of an impact thereof, is subjected to a load by the passenger, then the pressure on the inside of the air bag increases corresponding to the load exerted thereon by the passenger which load depends, on the one hand, on the relative velocity resulting between passenger and vehicle at large decelerations of the vehicle at which the passenger is no longer able to keep his position with respect to the vehicle by his own forces, and on the other, on the weight of the passenger. The pressure increase in the air bag which goes beyond the inflating pressure and depends on the impact energy of the passenger, brings about that the cover 5 retained by way of the elastic holding elements 6, is displaced in the direction toward the discharge aperture 4, and more particularly in the outflow direction of the gases, as indicated by arrows 7. As a result thereof, as is clearly visible from FIGS. 1, 3 and 4, the free discharge cross section is reduced, and more particularly, the more so the greater the pressure increase. This has a consequence that the quantity of the gases flowing out of the air bag by way of the discharge valve 2 essentially remains approximately constant over a wide control range independently of the prevailing load exerted at any given time by the passenger on the air bag and therewith of the internal pressure within the air bag, which is aimed at in order to utilize in an optimum manner the deceleration path available within the vehicle independently of the impact energy of the passenger, i.e., of the loads acting on the air bag.

If, as in the embodiment according to FIGS. 1 to 4, the elasticity of the holding elements 6 is so chosen that at extreme loads of the air bag and at a corresponding high gas pressure, the cover 5 is also able to completely close the discharge aperture 4, then it is appropriate within the scope of the present invention to provide, in addition to the discharge valve 2, a gas outlet opening (not shown) in the air bag, which is so matched in its opening cross section to the discharge valve that also with a closed or nearly closed discharge valve, a corresponding gas quantity can still flow out of the air bag.

Whereas in the embodiment according to FIGS. 1 to 4, the discharge valve is so constructed that the emptying of the air bag starts already during the inflation thereof, which presupposes a certain though relatively small excess of gas serving for the filling of the air bag, a discharge valve according to the present invention is illustrated in the embodiment according to FIGS. 5 to 9, where it is designated generally by reference numeral 8, which is essentially closed during the inflating operation. To that end, the discharge valve 8 according to FIGS. 5 to 9 which in its basic construction corresponds to that according to FIG. 1 and in which corresponding parts are designated by the same reference numerals as in the embodiment according to FIGS. 1–4, includes a closure ring 9 disposed in front of or upstream of the holding elements 6 in relation to the outflow direction 7 of the gas and covering the annular area between the cover 5 and the housing 3 or the wall 1 of the air bag in the normal initial position of the holding elements 6. The closure ring 9 is connected in this embodiment with the walls 1 of the air bag and consists of an essentially inelastic material.

As a result of the difference in elasticity between the retaining or holding elements 6 and the closure ring 9, an annular gap 10 (FIG. 7) results between the closure ring 9 and the cover 5 during an increase of the pressure within the air bag above the inflating pressure, by way of which the gas can reach the discharge valve 8 from the air bag. The gas flows out of the discharge valve 8 into the atmosphere by way of the discharge aperture 4. The course of the gas flow which results therefrom, is indicated in FIG. 7 by arrows 11. The gas quantity flowing out of the air bag is thereby determined additionally by the spacing between the cover 5 and the discharge aperture 4 and the size of the annular space between the cover 5 and the housing 3. The discharge valve 8 is so constructed in this embodiment that upon exceeding the inflating pressure by a predetermined minimum pressure, a discharge quantity results which is far-reachingly independent from the interior pressure of the air bag and which essentially remains approximately the same over a wide control range.

As is illustrated in FIG. 8, also in this embodiment, the cover 5 may completely close the discharge aperture 4 in case of an internal pressure of the air bag which is relatively high with respect to the inflating pressure. In order not to jeopardize the function of the air bag as a result of such a closure of the discharge valve 8, according to a further feature of the present invention also the air bag equipped with a discharge valve according to FIGS. 5 to 9 may be provided with an additional gas outlet opening which, however, is again not shown for the sake of simplicity.

If one dispenses with an additional gas discharge opening in an air bag equipped with a discharge valve according to the present invention, then it may be appropriate to so select the elasticity of the holding elements 6 deviating from the embodiment described by reference to the various figures of the drawing, that a complete closure of the discharge aperture 4 by means of the cover 5 is not possible. It may also prove advantageous for that purpose to so construct the cover that also in case of an abutment thereof at the housing 3, a complete closure of the discharge aperture 4 is not attained.

If it is to be avoided according to the present invention that the pressure building up within the air bag under load can exceed a predetermined maximum value, then the holding elements 6 can be so constructed and/or the cover and the discharge aperture can be so matched in their respective size that upon reaching the maximum pressure, the cover 5 is pushed out toward the outside through the discharge aperture 4 as illustrated in FIG. 9. Such a construction may according to the present invention also be of advantage if in addition to the discharge valve a gas discharge opening is provided in the air bag.

Of course, it is also possible within the scope of the present invention to so match the discharge valve possibly in conjunction with an additional gas discharge opening that also relationships other than the described dependencies for the gas discharge quantity out of the air bag result as a function of the pressure in the air bag, and more particularly, for example, by a corresponding choice of the elasticity of the holding elements 6.

A fabric part may serve as material for the cover 5 within the frame of the present invention. The retaining or holding elements 6 can be constituted by rubber bands or similar elastic bands which preferably are so arranged that they extend radially in relation to the center of the cover 5 or the center of the discharge aperture 4. The housing 3 can be constituted by a bulge of the wall 1 of the air bag itself or also by a part connected therewith, preferably adhesively bonded, welded or sewn thereto. Appropriately, also the holdng elements 6 and the closure ring 9 are connected with the walls 1 of the air bag by adhesive bonding, welding or sewing. In one embodiment which is particularly advantageous within the scope of the present invention, the closure ring can also be constituted directly by a ring section of the wall of the air bag projecting beyond the edge of the housing 3.

The discharge valve according to the present invention with its discharge aperture positioned in front or upstream thereof in relation to the outflow and retained by the elastic retaining elements is characterized by great constructive simplicity, complete freedom from service and high operating reliability and thus fulfills all requirements which are of the highest importance in particular as regards safety systems.

Since the described discharge valve according to the present invention is made with advantage essentially only of non-rigid materials, namely, of the housing 3 consisting of fabric or the like, of the cover 5 consisting also of fabric or the like and of the elastic bands 6, it can be folded and/or collapsed and thus does not impair a space-saving accommodation of the air bag equipped therewith. Furthermore, the construction described above of the present invention also entails the advantage that the discharge valve cannot cause any damages, such as, for example, injuries of the passengers, on the one hand, during the inflation of the air bag, and on the other, during the catching of the passenger by the air bag.

While we have shown and described two embodiments in accordance with the present invention, it is understood that the same is not limited thereto, but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. A discharge valve for a gas bag of the type serving as a passenger protective device in vehicles, which bag is automatically inflatable by means of a gas upon exceeding a predetermined vehicle deceleration and is adapted to be empited with delay by way of the discharge valve; said discharge valve comprising:
discharge aperture means,
and discharge aperture control means for controlling the free discharge cross section of said discharge aperture means such that said free discharge cross section decreases with an increasing pressure in said gas bag.

2. A discharge valve according to claim 1, wherein said air bag is fixedly connectpd to said discharge valve, and wherein said air bag is for protecting passengers in a motor vehicle.

3. A discharge valve according to claim 1, wherein said control means includes means assuring a continuously varying decrease in said free discharge cross section with a continuously increasing pressure in said gas bag, whereby varying size free discharge cross sections are provided over a range of internal gas bag pressures.

4. A discharge valve according to claim 41, wherein said discharge aperture means is arranged in the bottom of a substantially cupshaped housing of said discharge valve,
and wherein said control means includes cover means and elastic retaining means for elastically retaining said cover means in position with respect to said discharge aperture means, wherein movement of said cover means with respect to said discharge aperture means effects changes in said free discharge cross section, and wherein said cover means is movable against the force of said elastic retaining means in a direction of decreasing free discharge cross section in response to increased pressure on a side of said cover means communicable directly with the pressure in said air bag.

5. A discharge valve according to claim 4, wherein said cover means is constructed such that it is movable in a direction toward said discharge aperture means to decrease said free discharge cross section while said elastic retaining means are continuously increasingly tensioned.

6. A discharge valve according to claim 5, wherein said cover means and said discharge aperture means have dimensions in a direction transverse to the direction of movement of said cover means that are smaller than the corresponding adjacent dimensions of said housing means such that said free discharge cross section is formed between peripheral edges of said cover means and walls of said housing means.

7. A discharge valve according to claim 4, characterized in that the air bag includes wall means and the discharge valve is provided in the wall means of the air bag.

8. A discharge valve according to claim 7, characterized in that the housing means protrudes from the bag in the direction of the discharge flow of the gases.

9. A discharge valve according to claim 8, characterized in that the inside of said housing means is constructed of substantially truncated, conical shape and tapers in the discharge direction of the gases.

10. A discharge valve according to claim 9, characterized in that the housing means is constituted by a bulge of the wall means of the air bag.

11. A discharge valve according to claim 9, characterized in that the housing means consists of a separately made fabric part which is connected with the wall means of the air bag.

12. A discharge valve according to claim 11, characterized in that the fabric part of the housing means is connected with the wall means of the air bag by any one of bonding, welding or sewing.

13. A discharge valve according to claim 9, characterized in that the cover means extends in the inflated and non-loaded condition of the air bag approximately in the edge plane of the cup-shaped housing means.

14. A discharge valve according to claim 9, characterized in that the cover means extends in the inflated and non-loaded condition of the air bag approximately in the wall plane thereof.

15. A discharge valve according to claim 9, characterized in that the cover means is flexible.

16. A discharge valve according to claim 15, characterized in that the cover means is constituted by a fabric part.

17. A discharge valve according to claim 10, characterized in that elastic bands are provided as retaining means.

18. A discharge valve according to claim 12, characterized in that the cover means is constituted by a fabric part.

19. A discharge valve according to claim 12, characterized in that at least three elastic bands are provided distributed substantially uniformly over the circumference of the cover means.

20. A discharge valve according to claim 14, characterized in that the elastic bands of the retaining means are disposed in their normal position substantially in a plane containing the cover means.

21. A discharge valve according to claim 14, characterized in that the cover means and the discharge aperture means are constructed of circular shape.

22. A discharge valve according to claim 16, characterized in that an annular area is provided between the cover means and the housing means adapted to be bridged by the retaining means.

23. A discharge valve according to claim 17, characterized in that the annular area between the cover means and the housing means is covered in the normal position of the retaining means by a closure ring disposed upstream of the retaining means in relation to the discharge direction of the gas.

24. A discharge valve according to claim 23, characterized in that the closure ring is essentially immovable in its position.

25. A discharge valve according to claim 24, characterized in that the closure ring consists of essentially inelastic material.

26. A discharge valve according to claim 25, characterized in that the closure ring is connected with the wall means of the air bag.

27. A discharge valve according to claim 26, characterized in that a gas outlet opening is provided in the air bag means in addition to the discharge valve.

28. A discharge valve according to claim 7, characterized in that the housing means is constituted by a bulge of the wall means of the air bag.

29. A discharge valve according to claim 42, characterized in that the housing means is constructed of substantially truncated, conical shape and tapers in the discharge direction of the gases.

30. A discharge valve according to claim 7, characterized in that the housing means consists of a separately made fabric part which is connected with the wall means of the air bag.

31. A discharge valve according to claim 30, characterized in that the fabric part of the housing means is connected with the wall means of the air bag by any one of bonding, welding or sewing.

32. A discharge valve according to claim 4, characterized in that the cover means extends in the inflated and non-loaded condition of the air bag approximately in the edge plane of the cup-shaped housing means.

33. A discharge valve according to claim 4, characterized in that the cover means extends in the inflated and non-loaded condition of the air bag approximately in the wall plane thereof.

34. A discharge valve according to claim 4, characterized in that the cover means is flexible.

35. A discharge valve according to claim 34, characterized in that the cover means is constituted by a fabric part.

36. A discharge valve according to claim 4, characterized in that elastic bands are provided as retaining means.

37. A discharge valve according to claim 36, characterized in that at least three elastic bands are provided distributed substantially uniformly over the circumference of the cover means.

38. A discharge valve according to claim 36, characterized in that the elastic bands of the retaining means are disposed in their normal position substantially in a plane containing the cover means.

39. A discharge valve according to claim 4, characterized in that the cover means and the discharge aperture means are constructed of circular shape.

40. A discharge valve according to claim 4, characterized in that an annular area is provided between the cover means and the housing means adapted to be bridged by the retaining means.

41. A discharge valve according to claim 40, characterized in that the annular area between the cover means and the housing means is covered in the normal position of the retaining means by a closure ring disposed upstream of the retaining means in relation to the discharge direction of the gas.

42. A discharge valve according to claim 41, characterized in that the closure ring is essentially immovable in its position.

43. A discharge valve according to claim 41, characterized in that the closure ring consists of essentially inelastic material.

44. A discharge valve according to claim 41, characterized in that the closure ring is connected with wall means of the air bag.

45. A discharge valve according to claim 4, characterized in that a gas outlet opening is provided in the air bag means in addition to the discharge valve.

* * * * *